(12) United States Patent
Tan et al.

(10) Patent No.: US 10,766,583 B2
(45) Date of Patent: Sep. 8, 2020

(54) BIONIC LATERAL-LINE SENSOR

(71) Applicant: Ocean University of China, Qingdao (CN)

(72) Inventors: Shizhe Tan, Qingdao (CN); Bowen Tan, Qingdao (CN); Wei Ding, Qingdao (CN); Hengyuan Liu, Qingdao (CN); Kaili Tian, Qingdao (CN)

(73) Assignee: Ocean University of China, Qingdao (CN)

( * ) Notice: Subject to any disclaimer, the term of this patent is extended or adjusted under 35 U.S.C. 154(b) by 0 days.

(21) Appl. No.: 16/386,799

(22) Filed: Apr. 17, 2019

(65) Prior Publication Data

US 2020/0172215 A1 Jun. 4, 2020

(30) Foreign Application Priority Data

Nov. 30, 2018 (CN) .......................... 2018 1 1452156

(51) Int. Cl.
| | | |
|---|---|---|
| *G01D 5/14* | (2006.01) | |
| *G01C 13/00* | (2006.01) | |
| *B63C 11/52* | (2006.01) | |
| *G01D 11/24* | (2006.01) | |

(52) U.S. Cl.
CPC ............ *B63C 11/52* (2013.01); *G01C 13/002* (2013.01); *G01D 5/14* (2013.01); *G01D 11/245* (2013.01)

(58) Field of Classification Search
CPC ...... G01D 5/14; G01D 11/245; G01C 13/002; B63C 11/52
See application file for complete search history.

(56) References Cited

U.S. PATENT DOCUMENTS 4,499,640 A * 2/1985 Brenton ................ G01F 23/266
264/262
4,599,975 A * 7/1986 Reeve ..................... F22B 37/56
122/379

* cited by examiner

*Primary Examiner* — Jewel V Dowtin
(74) *Attorney, Agent, or Firm* — Mintz Levin Cohn Ferris Glovsky and Popeo, P.C.

(57) ABSTRACT

The present invention discloses a new bionic lateral-line sensor. The new bionic lateral-line sensor includes a cilia cupule, a cilia base rod, IPMC film sheets, extraction electrodes, and a sensor housing. When external current acts on a free end of the cilia cupule, mechanical deformation is generated on the cilia cupule, and the mechanical deformation is transmitted to the cilia base rod, so as to cause deformation on the cilia base rod; the deformation on the cilia base rod leads to mechanical deformation on the IPMC film sheets, and the IPMC film sheets generate induced voltages by using an IPMC mechano-electric effect; and a flow rate of the external current is calculated according to the acquired induced voltages. The new bionic lateral-line sensor provided in the present invention is used for measurement of external current. The cilia cupule and the cilia base rod are integrated, and the IPMC film sheet is used to replace a strain gauge, and is installed on the cilia base rod directly, so as to implement an integrated design and feature simple structure and convenient installation. In addition, an induced voltage can be output accurately by using the new bionic lateral-line sensor, to obtain a flow rate.

10 Claims, 8 Drawing Sheets

BIONIC LATERAL-LINE SENSOR

CROSS-REFERENCE TO RELATED APPLICATIONS

This application claims priority to Chinese Patent Application No. 201811452156.8, filed Nov. 30, 2018, and entitled "New Bionic Lateral-Line Sensor", the disclosure of which is incorporated herein by reference in its entirety.

TECHNICAL FIELD

The present invention relates to the underwater sensor field, and in particular, to a new bionic lateral-line sensor.

BACKGROUND

Ocean current measurement plays an important role in marine science research and engineering applications. Therefore, the research on new ocean current sensing technologies has always been a focus of marine scientific technological workers and marine engineering implementers. Marine organisms, especially fish, have a unique and highly sensitive sensory organ, that is, a lateral line system. Fish can effectively perceive a surrounding ocean flow field by using the lateral line system.

Ocean current sensors may be divided into a mechanical propeller type sensor, an electromagnetic sensor, an acoustic sensor, and an optical sensor according to a principle. Typical measuring instruments include an Ekman current meter, an S4 electromagnetic current meter produced by Interocean Inc. in the United States, a 2-D time difference type acoustic current meter produced by Falmouth Scientific Inc., an Aanderaa current meter RCM-9 (a Doppler acoustic current meter) in Norwegian, an acoustic Doppler current profiler, a particle imaging velocimeter PIV, and the like. These measuring methods have their own advantages, and also have specific disadvantages. For example, an acoustic sensor is affected by seawater temperature, salinity, suspended particles, acoustic scattering, multipath propagation, and the like, causing a decrease in precision; precision of an optical sensor is affected by seawater turbidity. In addition, the foregoing sensors cannot form a distributed sensor array.

Currently, most of signal sensing structures of existing bionic lateral-line sensors include three parts: a cilia stressed rod, a strain beam, and a deformation measurement unit, where the deformation measurement unit generally uses a strain gauge. Strain gauges are installed on plane parts of four strut beams of the strain beam respectively. As a result, a structure is complex, and it is not easy to install.

SUMMARY

An objective of the present invention is to provide a new bionic lateral-line sensor, so as to resolve a problem that an existing bionic lateral-line sensor has a complex structure and is not easy to install.

To achieve the above purpose, the present invention provides the following technical solution.

A new bionic lateral-line sensor includes a cilia cupule, a cilia base rod, IPMC film sheets, extraction electrodes, and a sensor housing, where the cilia cupule is of a hollow structure, and the cilia base rod is disposed inside the cilia cupule;

the IPMC film sheet is disposed between the cilia base rod and the cilia cupule, where the IPMC film sheets include a first IPMC film sheet and a second IPMC film sheet; the extraction electrode is disposed on each of two sides of a fixed end of each IPMC film sheet; and a connection relationship of the four extraction electrodes is a concatenated structure; and a top end of the cilia cupule, a top end of the cilia base rod, and top ends of the IPMC film sheets are free ends; a bottom portion of the cilia base rod and bottom portions of the IPMC film sheets that are fastened inside a groove of the sensor housing are fixed ends; and the cilia cupule, the cilia base rod, and the IPMC film sheets form a cantilever beam structure; and when external current acts on a free end of the cilia cupule, mechanical deformation is generated on the cilia cupule, and the mechanical deformation is transmitted to the cilia base rod, so as to cause deformation on the cilia base rod, thereby leading to mechanical deformation on the IPMC film sheets and generating induced voltages.

Optionally, the sensor further includes a lead wire, where the lead wire is disposed inside the sensor housing and the lead wire is connected to the extraction electrode; and the lead wire is configured to transmit the induced voltage to a signal processing circuit.

Optionally, the sensor further includes an external pressing plate and a fastening screw, where the cilia cupule is of a hollow cylinder structure, and a top part of the cilia cupule is of an upward convex structure whose fracture surface is hemispherical, where the upward convex structure is used for reducing resistance; and a fixed end of the cilia cupule is fastened inside the sensor housing by using the external pressing plate, and the external pressing plate is fastened to the sensor housing by using the fastening screw.

Optionally, the sensor housing is a cylindrical boss; the groove is disposed in the cylindrical boss; a diameter of the groove is greater than that of the cilia base rod; and a gap between the cilia base rod and the groove is filled by polytetrafluoroethylene.

Optionally, the cilia cupule is made of an organosilicone rubber material.

Optionally, the cilia base rod is made of an organosilicone rubber material.

Optionally, the sensor further includes a sealing casing and a gland nut, where a central part of the sensor housing is processed into a partial thread structure; the lead wire is disposed inside the partial thread structure; and the gland nut is matched with the partial thread structure.

Optionally, the extraction electrode is adhered on the IPMC film sheet by using a conductive adhesive.

Optionally, the first IPMC film sheet and the second IPMC film sheet are disposed symmetrically; and the first IPMC film sheet and the second IPMC film sheet are connected by using a concatenated structure.

Optionally, the IPMC film sheet is adhered on the cilia base rod.

According to specific embodiments provided in the present invention, the present invention discloses the following technical effects: According to the new bionic lateral-line sensor provided in the present invention, a cilia cupule and a cilia base rod are integrated, and an IPMC film sheet is used to replace a strain gauge, and is installed on the cilia base rod directly, so as to implement an integrated design and feature simple structure and convenient installation.

In addition, in the present invention, two symmetric IPMC film sheets are used, and a concatenated structure of extraction electrodes is used, so as to increase an output value of an induced voltage output by the sensor, thereby improving sensitivity of the sensor.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a new bionic lateral-line sensor, so as to improve accuracy of an induced voltage output by the sensor.

To make the foregoing objective, features, and advantages of the present invention clearer and more comprehensible, the present invention is further described in detail below with reference to the accompanying drawings and specific embodiments.

Figure 1:
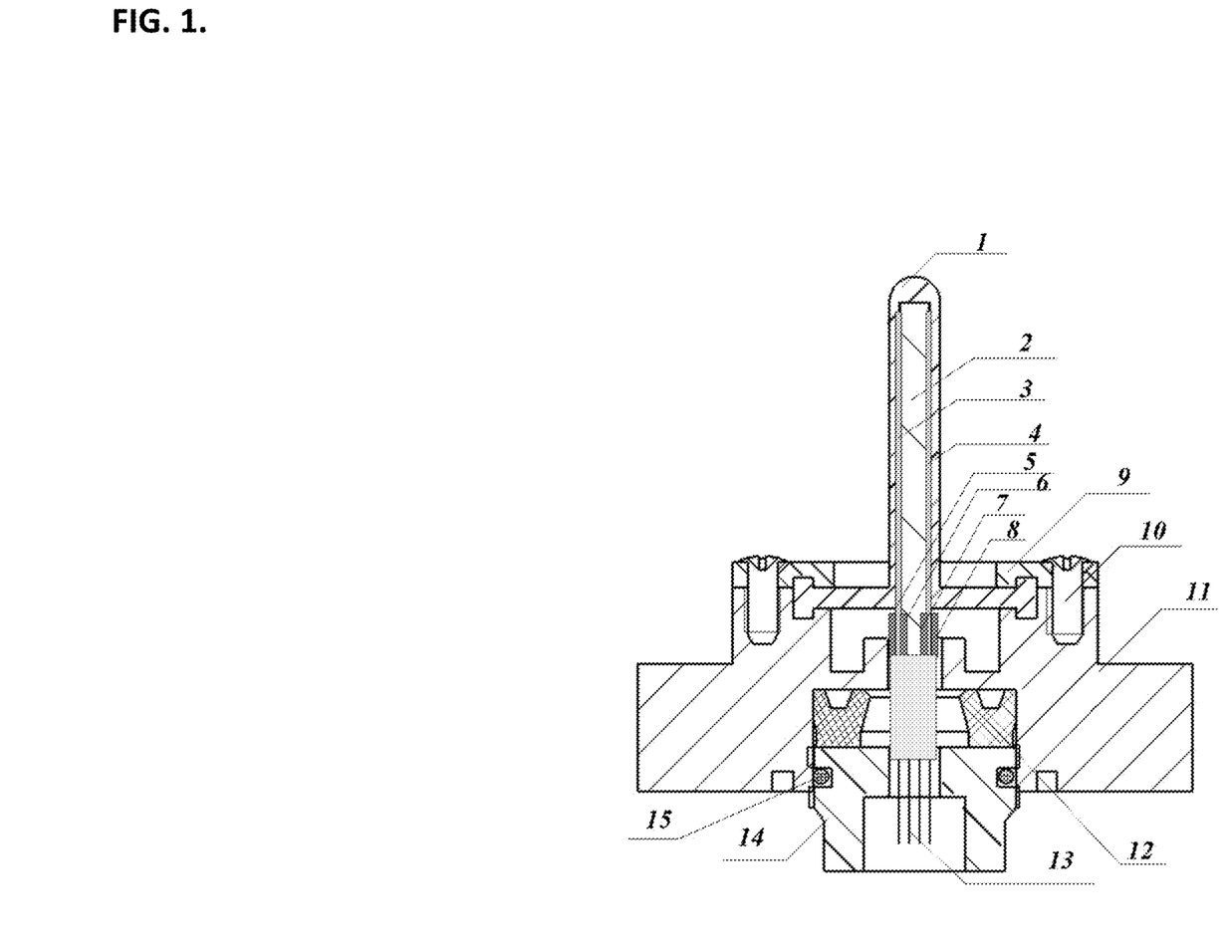
FIG. 1 is a section view of a new bionic lateral-line sensor according to some implementations of the present invention.

FIG. 1 is a section view of a new bionic lateral-line sensor according to the present invention. As shown in FIG. 1, the new bionic lateral-line sensor includes a cilia cupule 1, a cilia base rod 2, a first IPMC film sheet 3, a second IPMC film sheet 4, extraction electrodes (a first extraction electrode 5, a second extraction electrode 6, a third extraction electrode 7, and a fourth extraction electrode 8), an external pressing plate 9, a fastening screw 10, a sensor housing 11, a sealing casing 12, a lead wire 13, a gland nut 14, and an O-shaped seal ring 15.

The cilia cupule 1 is of a hollow structure, and the cilia base rod 2 is disposed inside the cilia cupule 1; the IPMC film sheet is disposed between the cilia base rod 2 and the cilia cupule 1, and the IPMC film sheets are fastened to two sides of the cilia base rod 2 by means of adhering; the extraction electrode is disposed on each of two sides of a fixed end at the bottom of each IPMC film sheet; and the electrodes are adhered on the two sides of a bottom portion of the IPMC film sheet by using a conductive adhesive. A connection relationship of the four extraction electrodes of the two IPMC sheets is a concatenated structure, a top end of the cilia cupule 1, a top end of the cilia base rod 2, and top ends of the IPMC film sheets form a free end of a cantilever beam; a bottom portion of the cilia cupule 1, a bottom portion of the cilia base rod 2, and bottom portions of the IPMC film sheets are fastened inside a groove of the sensor housing 11, forming a fixed end of the cantilever beam; and the cilia cupule 1, the cilia base rod 2, and the IPMC film sheets form a cantilever beam structure. When external current acts on a free end of the cilia cupule 1, mechanical deformation is generated on the cilia cupule 1, and the mechanical deformation is transmitted to the cilia base rod 2, so as to cause deformation on the cilia base rod 2, thereby leading to mechanical deformation on the IPMC film sheets and generating an induced voltage, so as to implement measurement of the external current.

As a new smart material, an ionic polymer metal composite (Ionic Polymer Metal Composite, IPMC) has a sensing characteristic, can convert external mechanical displacement (bending deformation) to an electrical signal for output, and the IPMC can be applied to design of a sensor due to the characteristic.

Figure 2:
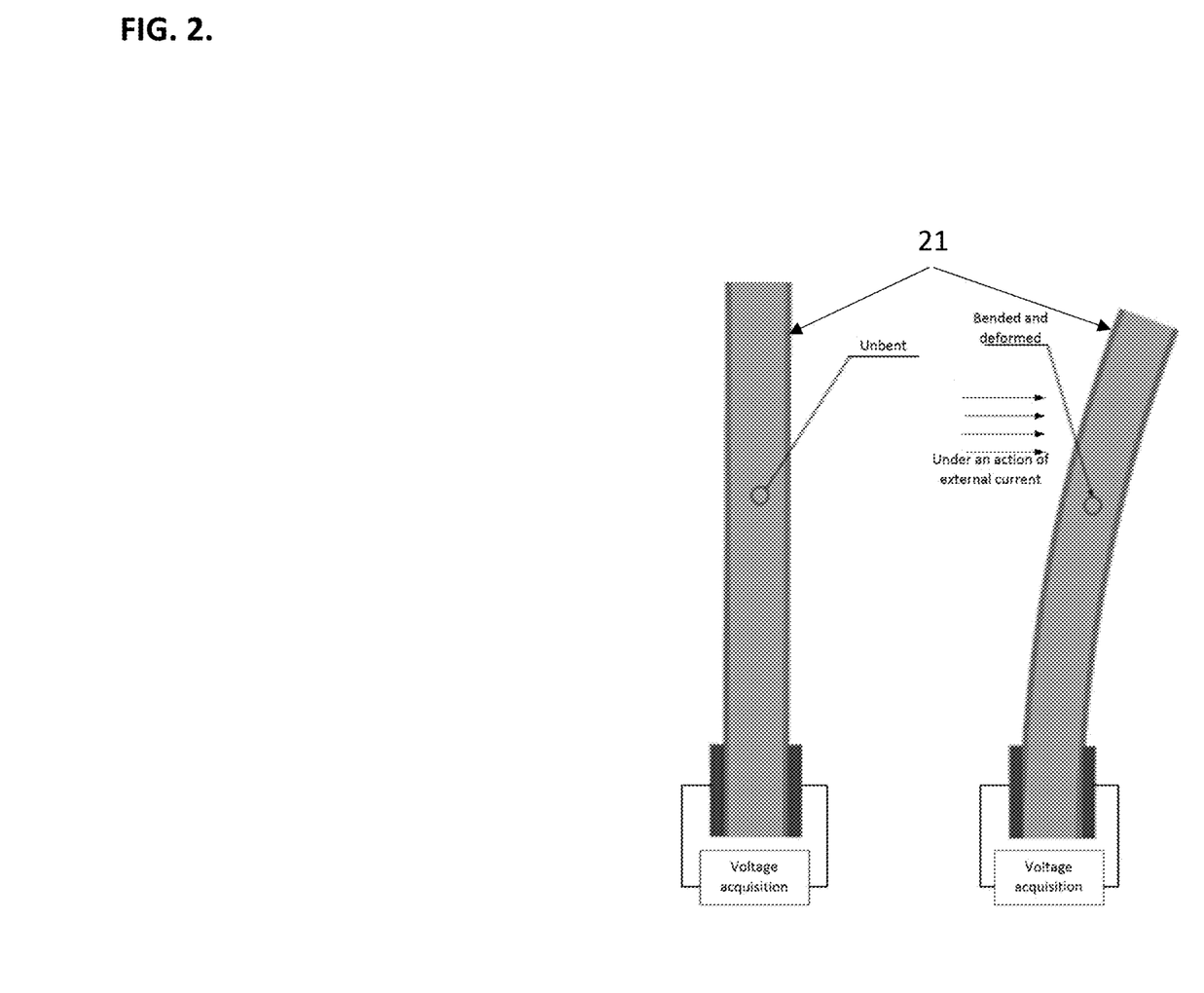
FIG. 2 is a schematic diagram of a sensing principle of an IPMC film sheet according to some implementations of the present invention.

When an IPMC material is applied to ocean current measurement, a basic principle thereof is shown in FIG. 2. When ocean current acts on an IPMC tail end (a free end) 21, it is equivalent to applying acting force on an IPMC, and bending deformation is generated on the IPMC tail end (the free end); the deformation on the IPMC tail end (the free end) causes differentiation of charge distribution inside the IPMC, and further an electric potential difference is generated between electrodes on two sides of the IPMC. In this way, flow rates of ocean current that are corresponding to different bending deformation can be obtained through mathematical treatment by acquiring the electric potential difference between the electrodes on the two sides.

Figure 3:
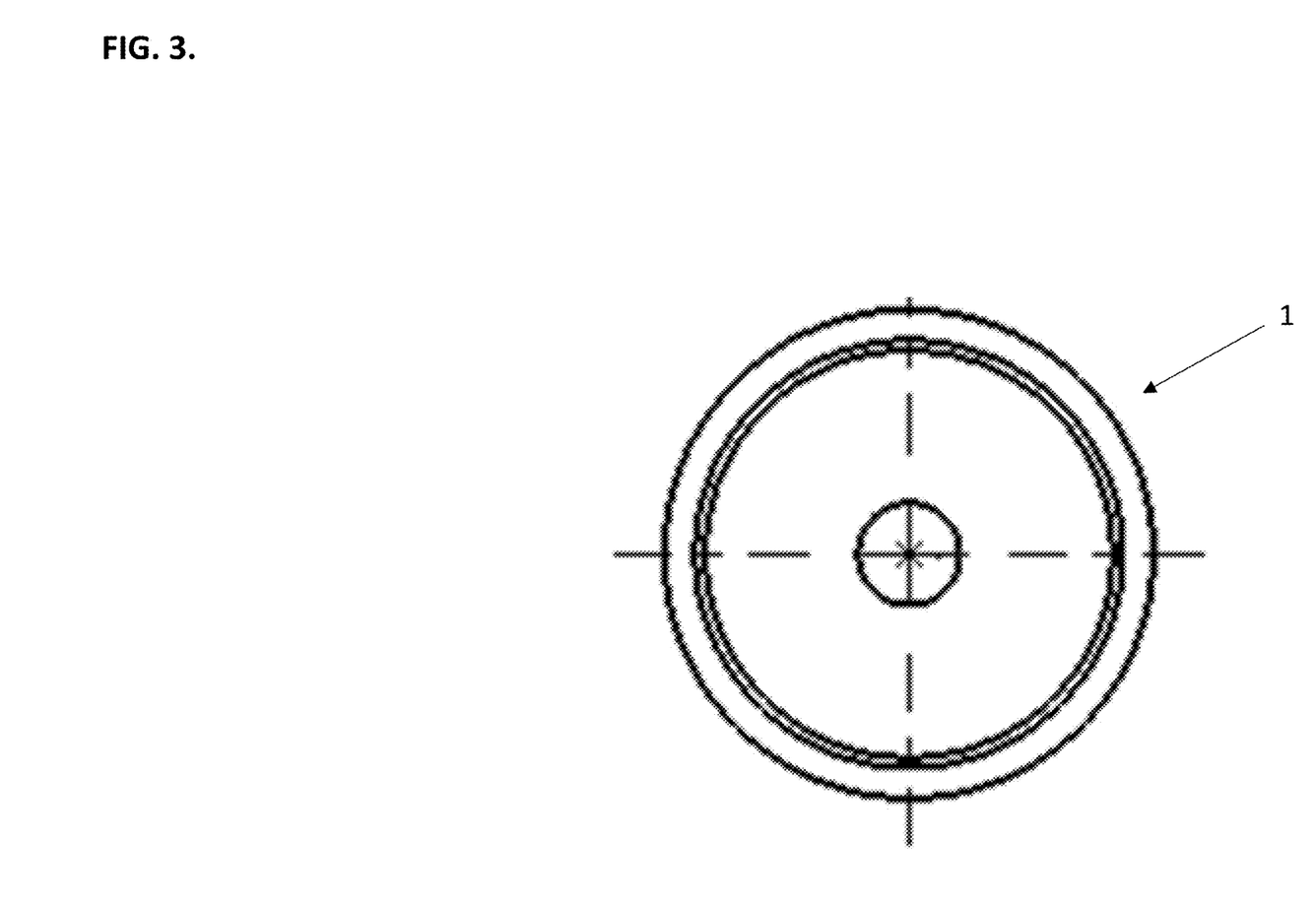
FIG. 3 is a top view of a cilia cupule according to some implementations of the present invention.
Figure 4:
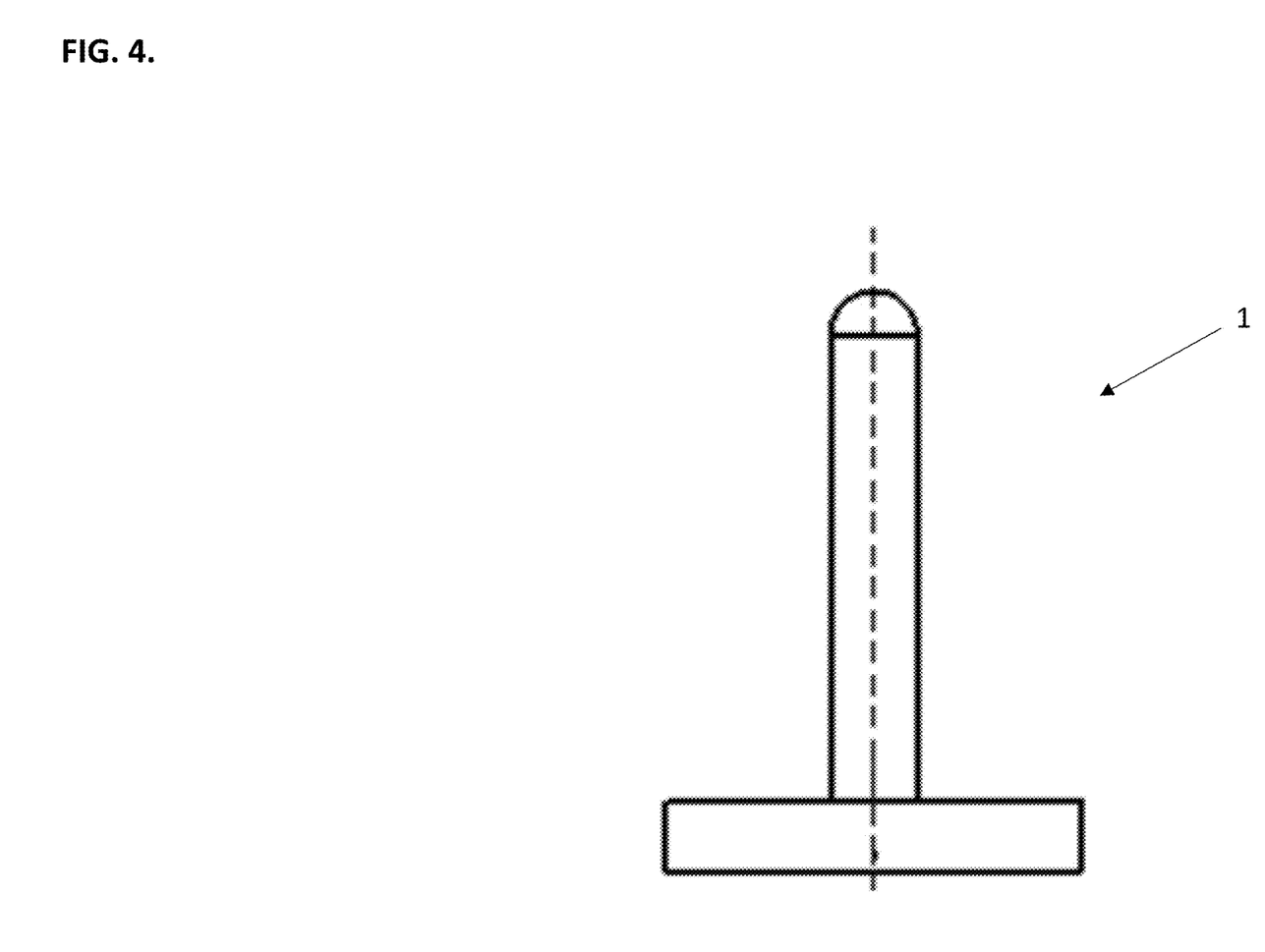
FIG. 4 is a front view of a cilia cupule according to some implementations of the present invention.
Figure 5:
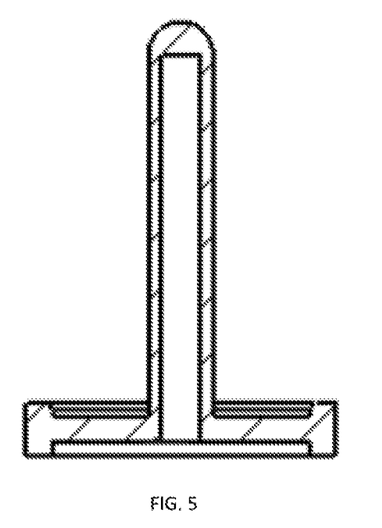
FIG. 5 is a section view of a cilia cupule according to some implementations of the present invention.

The cilia cupule 1 is cylindrical; a fracture surface of an upward convex part is of a hemispherical structure; two fixed edges of another end of the cilia cupule 1 are connected to the external pressing plate 9 and the sensor housing 11; an interior of the cilia cupule 1 is of a hollow cylinder structure; and the cilia base rod 2, the first IPMC film sheet 3, and the second IPMC film sheet 4 are installed inside the hollow cylinder. The cilia cupule 1 is made of an organosilicone rubber material (Polydimethylsiloxane, PDMS), a structure of the cilia cupule 1 is shown in FIG. 3 to FIG. 5.

Figure 6:
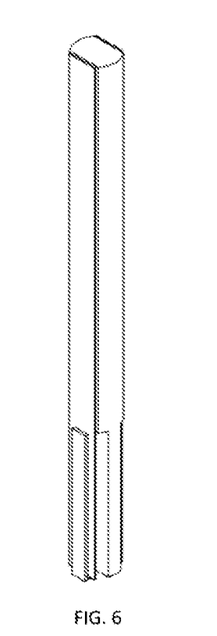
FIG. 6 is a schematic diagram of an assembly structure of an IPMC film sheet and extraction electrodes according to some implementations of the present invention.
Figure 7:
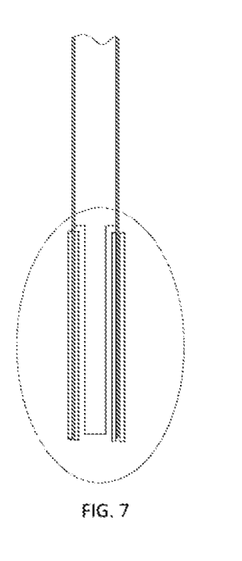
FIG. 7 is a sectional view of bottom portions of an IPMC film sheet and extraction electrodes according to some implementations of the present invention.
Figure 8:
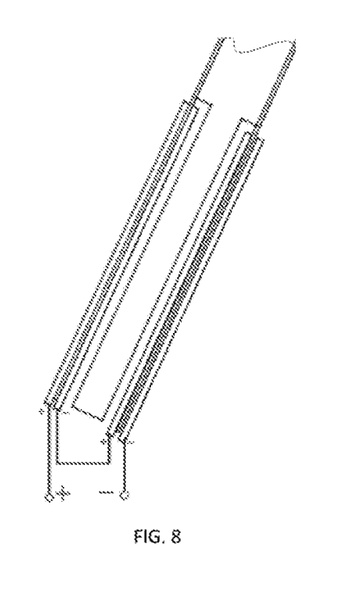
FIG. 8 is an enlarged view based on the sectional view of the bottom portions of the IPMC film sheet and the extraction electrodes shown in FIG. 7 according to some implementations of the present invention.

The cilia base rod 2 is cylindrical, and two symmetrical planes are obtained by cutting along the outside of the cylinder, and the first IPMC film sheet 3 and the second IPMC film sheet 4 are adhered on the two planes directly. The first extraction electrode 5 and the second extraction electrode 6 are adhered on two sides of a bottom portion of the first IPMC film sheet 3 by using the conductive adhesive. The third extraction electrode 7 and the fourth extraction electrode 8 are similarly adhered on two sides of a bottom portion of the second IPMC film sheet 4 by using the conductive adhesive. Top ends of the cilia base rod 2, the first IPMC film sheet 3, and the second IPMC film sheet 4 are in a free state, and bottom portions thereof are fastened inside the groove of the sensor housing 11, so as to form a cantilever beam structure, when external current acts on the cilia cupule 1, mechanical deformation is generated on the cilia cupule 1, and the mechanical deformation is transmitted to the cilia base rod 2, so as to cause deformation on the cilia base rod 2, thereby leading to mechanical deformation on the first IPMC film sheet 3 and the second IPMC film sheet 4 and generating induced voltages respectively. The induced voltages generated by the first IPMC film sheet 3 and the second IPMC film sheet 4 are extracted by using the first extraction electrode 5, the second extraction electrode 6, the third extraction electrode 7, and the fourth extraction electrode 8. The first extraction electrode 5, the second extraction electrode 6, the third extraction electrode 7, and the fourth extraction electrodes 8 are concatenated, and a structural form thereof is shown in FIG. 4. An assembly structure of the cilia base rod 2, the first IPMC film sheet 3, the second IPMC film sheet 4, and the extraction electrodes is shown in FIG. 6 to FIG. 8.

The concatenated structure form can increase output of an induced voltage, and increase a signal-to-noise ratio, and ultimately the induced voltage is output to a signal processing circuit through the lead wire 13 to be processed. The cilia base rod 2 is made of an organosilicone rubber (PDMS) material.

Figure 9:
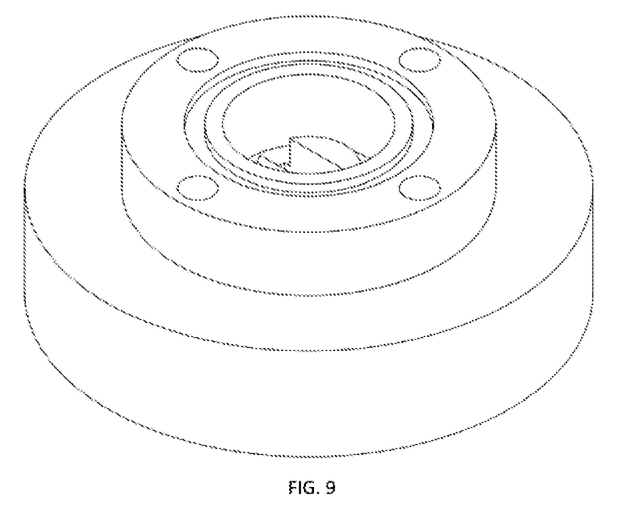
FIG. 9 is a schematic structural diagram of a sensor housing according to some implementations of the present invention.
Figure 10:
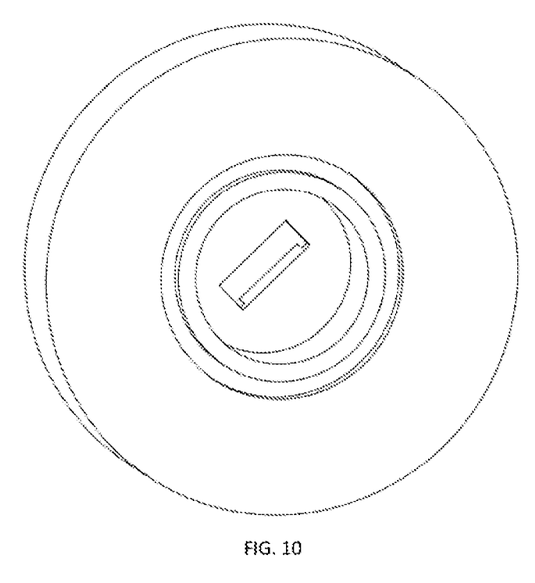
FIG. 10 is a schematic diagram of a bottom portion of a sensor housing according to some implementations of the present invention.

A structure of the sensor housing 11 is shown in FIG. 9 and FIG. 10. There is a cylindrical boss 91 in the center of an interior of the sensor housing 11; and a rectangular groove 101 is obtained by cutting along a center line of the boss. A width of the groove is slightly greater than a diameter of the cilia base rod 2, and the cilia base rod 2 is installed inside the groove, and after the cilia base rod 2 is installed, polytetrafluoroethylene is filled to fasten the cilia base rod 2.

Figure 11:
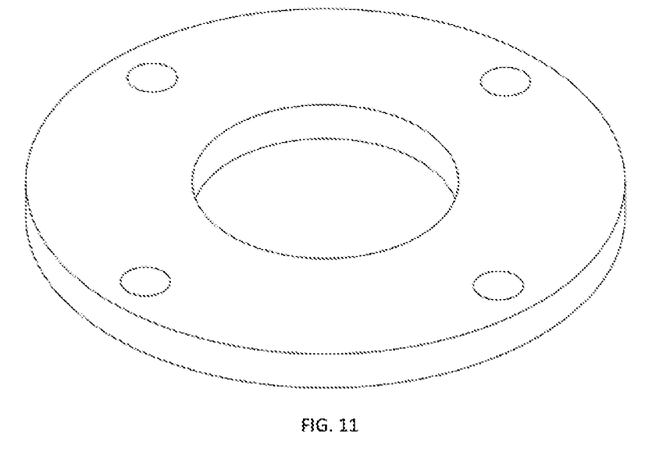
FIG. 11 is a structure diagram of a top part of an external pressing plate according to some implementations of the present invention.
Figure 12:
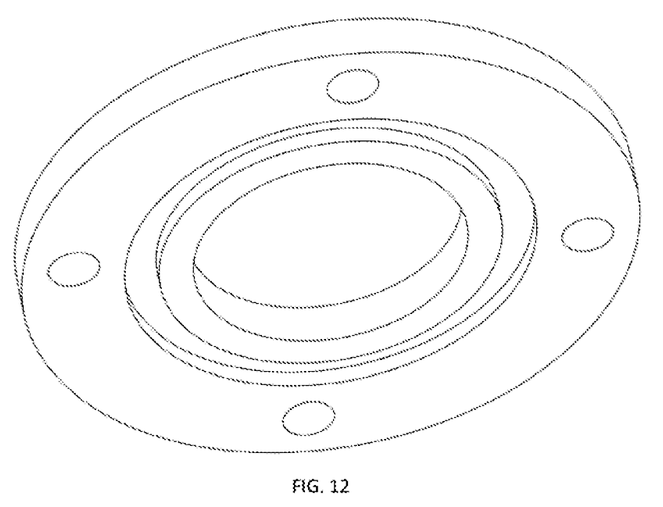
FIG. 12 is a structure diagram of a bottom portion of an external pressing plate according to some implementations of the present invention.

A structure of the external pressing plate 9 is shown in FIG. 11 and FIG. 12. An upper part of the sensor housing 11 is fastened to the external pressing plate 9 by using the screw 10. Fastening of the bottom portion of the cilia cupule 1 is implemented by using the external pressing plate 9, the groove in a top part of the sensor housing 11, and an embossment of the cilia cupule 1. Because the cilia cupule 1 is made of PDMS and has specific elasticity, this structure also has water tightness. A central part of a lower part of the sensor housing 11 is processed into a partial thread structure. The sealing casing 12 is installed inside a hole in the bottom portion of the sensor housing 11. The gland nut 14 is used for compression to make the O-shaped seal ring 15 located between the gland nut and an inner side of the hole in the bottom portion of the sensor housing, to implement sealing.

In actual application, the lead wire 13 is disposed inside the sensor housing 11, and the lead wire 13 is connected to the extraction electrode; and the lead wire 13 is configured to transmit the induced voltage to the signal processing circuit.

In actual application, the cilia cupule 1 is of a hollow cylinder structure, and a top part of the cilia cupule 1 is of an upward convex structure whose fracture surface is hemispherical, where the upward convex structure is used for reducing resistance. A fixed end at the bottom of the cilia cupule 1 is fastened inside the sensor housing 11 by using the external pressing plate 9, and the external pressing plate 9 is fastened to the sensor housing 11 by using the fastening screw 10.

In actual application, there is a cylindrical boss inside the sensor housing 11; the groove is disposed in the cylindrical boss; a diameter of the groove is greater than that of the cilia base rod 2; and a gap between the cilia base rod 2 and the groove is filled by polytetrafluoroethylene.

In actual application, the cilia cupule 1 is made of an organosilicone rubber material, and the cilia base rod 2 is made of an organosilicone rubber material.

In actual application, a central part of the bottom portion of the sensor housing 11 is processed into a partial thread structure; the lead wire 13 is disposed inside the partial thread structure; and the gland nut 14 is matched with the partial thread structure.

The present invention provides a new bionic lateral-line sensor. The new sensor is different from an existing cilia type bionic current sensor. In the new bionic lateral-line sensor, an IPMC film sheet is used to sense external current, and a cilia stressed rod and a strain beam of the existing sensor are integrated. In addition, the IPMC film sheet is used to replace a strain gauge, and is installed on the cilia base rod 2 directly, so as to implement an integrated design and feature simple structure, convenient installation, and the like.

Compared with a sensing structure composed of a single IPMC-sheet, in the present invention, a sensing material including two concatenated IPMC sheets is used to sense a flow rate of external current, and therefore the present invention obtains a relatively high output induced voltage, has advantages of small and exquisite structure, appropriate arrangement, fluid velocity sensitivity, and the like, and can accurately perceive an effect of fluid on the sensor during underwater work and accurately output an induced voltage.

Each embodiment of the present specification is described in a progressive manner, each embodiment focuses on the difference from other embodiments, and the same and similar parts between the embodiments may refer to each other.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. A new bionic lateral-line sensor, comprising
    a cilia cupule, a cilia base rod, ionic polymer metal composite (IPMC) film sheets, extraction electrodes, and a sensor housing, wherein
    the cilia cupule is of a hollow structure, and the cilia base rod is disposed inside the cilia cupule;
    the IPMC film sheet is disposed between the cilia base rod and the cilia cupule, wherein the IPMC film sheets comprise a first IPMC film sheet and a second IPMC film sheet;
    the extraction electrode is disposed on each of two sides of a fixed end of each IPMC film sheet; and a connection relationship of the four extraction electrodes is a concatenated structure; and a top end of the cilia cupule, a top end of the cilia base rod, and top ends of the IPMC film sheets are free ends;
a bottom portion of the cilia base rod and bottom portions of the IPMC film sheets that are fastened inside a groove of the sensor housing are fixed ends; and
the cilia cupule, the cilia base rod, and the IPMC film sheets form a cantilever beam structure; and
when external current acts on a free end of the cilia cupule, mechanical deformation is generated on the cilia cupule, and the mechanical deformation is transmitted to the cilia base rod, so as to cause deformation on the cilia base rod, thereby leading to mechanical deformation on the IPMC film sheets and generating induced voltages.

2. The new bionic lateral-line sensor according to claim 1, further comprising a lead wire, wherein
the lead wire is disposed inside the sensor housing and the lead wire is connected to the extraction electrode; and
the lead wire is configured to transmit the induced voltage to a signal processing circuit.

3. The new bionic lateral-line sensor according to claim 1, further comprising an external pressing plate and a fastening screw, wherein
the cilia cupule is of a hollow cylinder structure, and a top part of the cilia cupule is of an upward convex structure whose fracture surface is hemispherical, wherein the upward convex structure is used for reducing resistance; and
a fixed end of the cilia cupule is fastened inside the sensor housing by using the external pressing plate, and the external pressing plate is fastened to the sensor housing by using the fastening screw.

4. The new bionic lateral-line sensor according to claim 1, wherein the sensor housing is a cylindrical boss;
the groove is disposed in the cylindrical boss; a diameter of the groove is greater than that of the cilia base rod; and
a gap between the cilia base rod and the groove is filled by polytetrafluoroethylene.

5. The new bionic lateral-line sensor according to claim 1, wherein the cilia cupule is made of an organosilicone rubber material.

6. The new bionic lateral-line sensor according to claim 1, wherein the cilia base rod is made of an organosilicone rubber material.

7. The new bionic lateral-line sensor according to claim 2, further comprising a sealing casing and a gland nut, wherein
a central part of the sensor housing is processed into a partial thread structure; the lead wire is disposed inside the partial thread structure; and
the gland nut is matched with the partial thread structure.

8. The new bionic lateral-line sensor according to claim 1, wherein the extraction electrode is adhered on the IPMC film sheet by using a conductive adhesive.

9. The new bionic lateral-line sensor according to claim 1, wherein the first IPMC film sheet and the second IPMC film sheet are disposed symmetrically; and
the first IPMC film sheet and the second IPMC film sheet are connected by using a concatenated structure.

10. The new bionic lateral-line sensor according to claim 1, wherein the IPMC film sheet is adhered on the cilia base rod.

* * * * *

UNITED STATES PATENT AND TRADEMARK OFFICE
CERTIFICATE OF CORRECTION

Page 1 of 1

PATENT NO.         : 10,766,583 B2
APPLICATION NO.    : 16/386799
DATED              : September 8, 2020
INVENTOR(S)        : Shizhe Tan et al.

It is certified that error appears in the above-identified patent and that said Letters Patent is hereby corrected as shown below:

On the Title Page

Please replace the following in the Foreign Application Priority Data section:
"Nov. 30, 2018 (CN) ............... 2018 1 1452156"
With:
"Nov. 30, 2018 (CN) ............... 201811452156.8".

Signed and Sealed this
Twentieth Day of July, 2021

Drew Hirshfeld
*Performing the Functions and Duties of the
Under Secretary of Commerce for Intellectual Property and
Director of the United States Patent and Trademark Office*